United States Patent [19]

Abt et al.

[11] Patent Number: 4,546,648
[45] Date of Patent: Oct. 15, 1985

[54] ARRANGEMENT FOR MEASURING INJECTION QUANTITIES

[75] Inventors: Jürgen Abt, Gerlingen; Dieter Handtmann, Sindelfingen; Reinhard Schwartz, Stuttgart; Bertold Wocher, Leonberg, all of Fed. Rep. of Germany

[73] Assignee: Robert Bosch GmbH, Stuttgart, Fed. Rep. of Germany

[21] Appl. No.: 542,070

[22] Filed: Oct. 14, 1983

[30] Foreign Application Priority Data

Oct. 14, 1982 [DE] Fed. Rep. of Germany ....... 3238107
Jan. 22, 1983 [DE] Fed. Rep. of Germany ....... 3302059

[51] Int. Cl.$^4$ ........................................... G01M 15/00
[52] U.S. Cl. ................................................. 73/119 A
[58] Field of Search ........................ 73/119 A, 3, 168

[56] References Cited

U.S. PATENT DOCUMENTS 4,437,341  3/1984  Ito et al. ........................... 73/119 A

Primary Examiner—Jerry W. Myracle
Attorney, Agent, or Firm—Michael J. Striker

[57] ABSTRACT

An arrangement for measuring of the injection quantity, the injection beginning and the injection end of individual injections of an intermittently operating injection pump, has an injection chamber, an adjustable throttle connectable with the injection chamber at one location, a movable wall limiting the injection chamber at another location against the counterforce, a path sensor arranged to receive the position of the movable wall and supply a signal for adjustment of throttle.

13 Claims, 4 Drawing Figures

4,546,648

ARRANGEMENT FOR MEASURING INJECTION QUANTITIES

BACKGROUND OF THE INVENTION

The present invention relates to an arrangement for measuring injection quantities. More particularly, it relates to an arrangement for measuring the injection quantities, the injection beginning and the injection end.

Arrangements of the above-mentioned general type are known in the art. In known arrangements it is necessary to provide for each injection passage of an injection pump its own measuring device. It is to be understood that such a construction is expensive and complicated.

SUMMARY OF THE INVENTION

Accordingly, it is an object of the present invention to provide an arrangement for measuring injection quantities, which avoids the disadvantages of the prior art.

More particularly, it is an object of the present invention to provide an arrangement for measuring injection quantities in which for any number of injection passages to be tested only one measuring device with a main connecting device is needed.

In keeping with these objects and with others which will become apparent hereinafter, one feature of the present invention resides, briefly stated, in an arrangement for measuring the injection quantity, the injection beginning and the injection end of individual injections of an intermittently operating injection pump, which has an injection chamber, an adjustable throttle arranged to close the injection chamber at its one location, a movable wall limiting the injection chamber at another location with a counterforce, and a path sensor which receives the position of the movable wall and produces the signal for adjusting the throttle.

When the arrangement is designed in accordance with the present invention, it provides that for any number of the injection passages to be tested only one measuring arrangement with a main connecting device is needed.

This arrangement is based on the principle that it is sufficient for measuring the injection quantities of each individual injection passage of the injection pump, in that the main connecting device determines only the ratio of the individual stroke delivered quantities relative to one another, and the subsequently arranged continuous through-flow measuring device determines the average value over all outlets of the injection pump. In this manner, a very price favorable and accurately operating arrangement for measuring and testing the injection quantities of injection pumps is obtained. With the same arrangement the injection beginning and the injection end of an injection can also be measured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
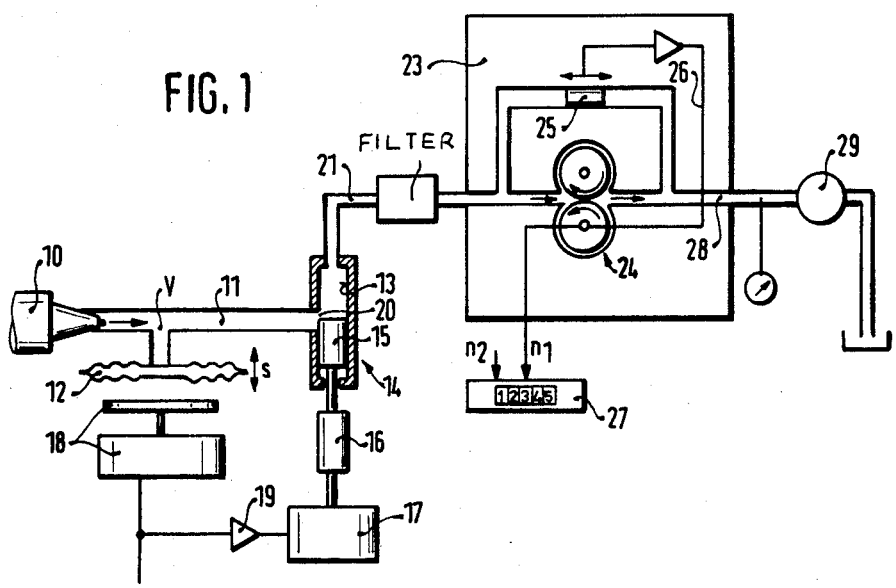
FIG. 1 is a view showing an arrangement for measuring injection quantities in a substantially schematic illustration.

The injection arrangement according to the present invention includes an injection nozzle which is identified with reference numeral 10 in FIG. 1. It can include several such nozzles. The injection nozzle 10 is connected with a volume V. The volume substantially contains a conduit 11 and a wave siphon diaphragm 12.

The conduit 11 opens into a chamber 13 of a throttle valve 14. A throttle piston 15 moves in the chamber 13 and has an end portion which extends outwardly beyond the chamber 13 and supports a spindle 16. The spindle 16 is driven from an electric variable speed motor 17. The electric motor 17 is in turn controlled from a path sensor 18 via an electric amplifier 19. The path sensor 18 is in contactless operative connection with the wave siphon diaphragm 12.

The throttle piston 15 controls a slot 20 of the chamber 13 which receives the throttle piston 15. The chamber 13 communicates via an opening 21 with a subsequently arranged continuous through-flow measuring device 23. The through-flow measuring device 23 includes substantially a gear pump 24 and a piston 25 connected in parallel therewith and loaded with a pressure differential between an inlet and an outlet of the pump. Variations of the piston 25 from its central position are signalled for the regulation of the number of revolutions of the gear pump 24 via an electric control loop 26 to an electric variable speed motor which drives the gear pump 24. At the gear pump 24 a volume stream flows, the volume stream being supplied to the gear pump via a measuring device. At the end of an outlet conduit 28 of the gear pump, a pressure regulating pump 29 is arranged so as to maintain a pressure of substantially 2 bar.

The number of revolutions n, in one of the gear pumps 24 is proportional to the volume stream and is given as a frequency-analogous signal to an inlet 1 of the frequence ratio counter 27. The frequency-analogous signal $n_2$ of the number of revolutions of the injection pump is given to the second inlet of the counter 27. The record value $n_1/n_2$ of the counter is then proportional to the individual stroke feed quantities of the injection pump averaged over all outlets. The quantity sprayed from one or several injection nozzles 10 of the injection pump is sprayed into the liquid volume V, which is retained small and is free of bubbles and, as mentioned above, is substantially formed by the wave siphon diaphragm 12.

Figure 2:
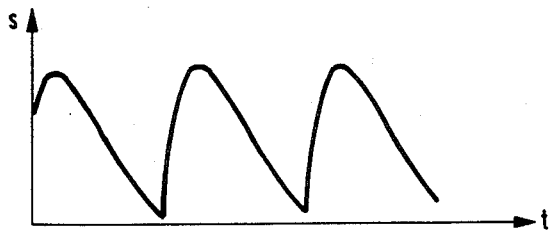
FIGS. 2 and 3 are diagrams illustrating the operation of the inventive arrangement for measuring the injection quantities.

The path sensor 18 which receives the deflection of the wave siphon diaphragm controls the throttle piston 15 so that the average pressure $p_1$ of the volume V is equal to for example 3 bar. The control circuit is designed so that the adjustment of the throttle valve with constant medium delivered quantity also with the variable pressure $p_1$ is fixed in a certain region $p_1 \pm \Delta p$ and makes no control movement. With this adjustment the path sensor 18 supplies a signal pattern S(t) corresponding to FIG. 2 which is shown underneath the path sensor and in which the amplitude shows a value for the quantity per stroke of the individual injections. The abscissa of FIG. 2 represents the time. The pressure $p_2$ behind the throttle valve 14 amounts to substantially 2 bar.

Figure 3:
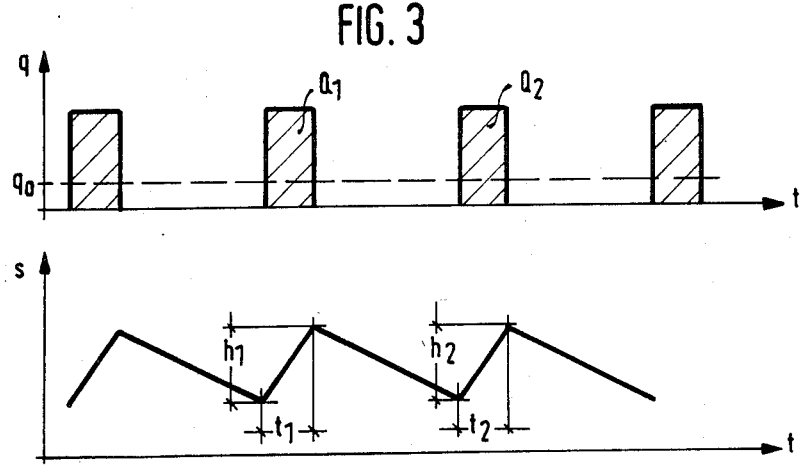

Under the assumption that the individual delivered quantity impulses have substantially the same pattern the following ratio of the delivered quantity from stroke to stroke can be approximately shown as follows:

$$\frac{Q_1}{Q_2} = \frac{h_1}{h_2}$$

wherein in accordance with FIG. 3:
$Q_n$ is a delivered quantity in a stroke n,
$h_n$ is an amplitude of the path signal s(t),
$t_n$ is a length of the individual injection.
Moreover (with $p_1$ = constant):

$$\frac{ds}{dt} \sim q(t) - q_0$$

wherein q(t) is a delivered quantity course during the injection, $q_0$ is a constant continuous delivered quantity which flows through the throttle.

In correspondence with FIG. 3 it is possible to determine from the signal pattern s(t) the beginning of delivery, the end of delivery and through the values $h_n$ the ratio of the individual stroke delivered quantities. It is believed to be clear that the measurements have greater accuracy with steeper raising and falling flanks of the delivered quantity impulses.

Figure 4:
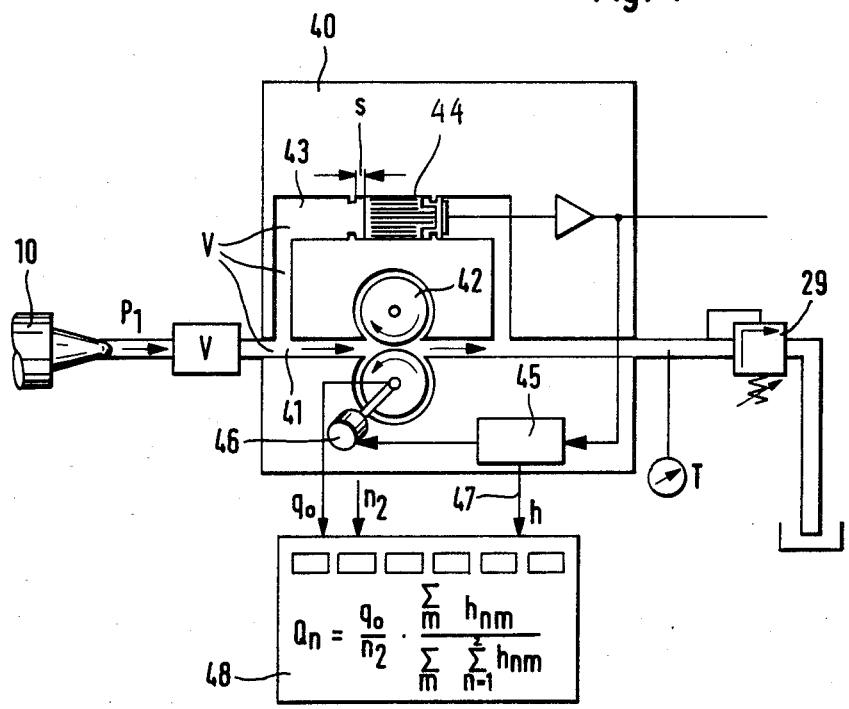
FIG. 4 is a view showing an arrangement for measuring injection quantities, in accordance with a second embodiment of the present invention.

The arrangement for measuring injection quantities in accordance with a second embodiment shown in FIG. 4 has a through-flow measuring device 40 into which the injection nozzle of several nozzles inject practically directly. More particularly they inject the quantities into a passage 41 which leads to a gear pump 42 and in a parallel passage 43 in which a piston 44 is slidingly guided. The passages 41 and 43 form the volume V of the first embodiment, which here however is approximately unyieldable or changeable only by movement of the piston 44. Its path s is supplied via an electric control loop 45 to a variable speed motor 46 for regulation of number of revolutions of the gear pump 42, on the one hand, and via an electric conductor 47 to an evaluating device 48 in which the amplitude of FIG. 2 is shown as value for quantity per stroke of the individual injections.

An evaluating device 48 is fed with: $q_0$ which is a continuous through-flow; $n_2$ which is a number of revolutions of the injection pump; $h_{nm}$ which is equal to impulse height; z which is equal to the number of the outlets; n which is equal to the numbering of the outlets; m which is equal to the numbering of the revolutions. From these values $Q_n$ can be determined as delivered quantity per stroke, the delivered quantity dispersion, and the injection beginning angle.

It will be understood that each of the elements described above, or two or more together, may also find a useful application in other types of constructions differing from the types described above.

While the invention has been illustrated and described as embodied in an arrangement for measuring the injection quantity, the injection beginning and the injection end of individual injections of an intermittently working injection pump, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for measuring the injection quantity, the injection beginning and the injection end of individual injections of an intermittently operating injection pump, comprising means forming an injection chamber; an adjustable throttle arranged at one location of said injection chamber so as to close the latter and including a throttle piston with a spindle; a movable wall arranged at another location of said injection chamber and limiting the same with a counterforce, said movable wall being formed as a wave siphon diaphragm which is deflectable; a path sensor arranged for sensing a position of said movable wall and supplying a signal for adjusting of said throttle; and means adjusting said throttle in response to said signal, said adjusting means including an electric variable speed motor which receives an electrical signal corresponding to the deflection of said wave siphon diaphragm and drives said spindle connected with said throttle piston.

2. An arrangement as defined in claim 1, wherein said spindle connected with said throttle piston of said throttle is formed as a threaded spindle.

3. An arrangement as defined in claim 1, wherein said path sensor is a contactless sensor.

4. An arrangement as defined in claim 1, wherein the injection pump has a cam shaft, said path sensor being arranged so that its signal corresponds to the instantaneous angle of the cam shaft of the injection pump.

5. An arrangement as defined in claim 1, and further comprising a delivered quantity measuring device arranged for continuously measuring the same and connected downstream of said injection chamber.

6. An arrangement as defined in claim 1, wherein the injection pump has at least one outlet connected with said injection chamber.

7. An arrangement for measuring the injection quantity, the injection beginning and the injection end of individual injections of an intermittently operating injection pump, comprising means forming an injection chamber; an adjustable throttle arranged at one location of said injection chamber so as to close the latter and having a controllable cross-section; a movable wall arranged at another location of said injection chamber and limiting the same with a counterforce; a path sensor arranged for sensing a position of said movable wall and supplying a signal for adjusting of said throttle; means for adjusting said throttle in response to said signal; and a mechanohydraulic pressure regulator for controlling the cross-section of said throttle to the pressure in said chamber.

8. An arrangement for measuring the injection quantity, the injection beginning and the injection end of individual injections of an intermittently operating injection pump, comprising means forming an injection chamber; an adjustable cross-section controlled throttle arranged at one location of said injection chamber so as to close the latter; a movable wall arranged at another location of said injection chamber and limiting the same with a counterforce; a path sensor arranged for sensing a position of said movable wall and supplying a signal for adjusting of said throttle; means for adjusting said throttle in response to said signal; and a control loop for controlling the cross-section of said throttle and having low pass characteristics.

9. An arrangement for measuring the injection quantity, the injection beginning and the injection end of individual injections of an intermittently operating injection pump, comprising means forming an injection chamber; an adjustable cross-section controlled throttle arranged at one location of said injection chamber so as to close the latter; a movable wall arranged at another location of said injection chamber and limiting the same with a counterforce; a path sensor arranged for sensing a position of said movable wall and supplying a signal for adjusting of said throttle; means for adjusting said throttle in response to said signal; and a control loop for controlling the cross-section of said throttle and formed as a two-point regulator with hysteresis.

10. An arrangement for measuring the injection quantity, particularly for measuring timely averaged delivered quantities ($Q_n$) of individual outlets of the injection pump, the injection beginning and the injection end of individual injections of an intermittently operating injection pump, comprising means forming an injection chamber; an adjustable throttle arranged at one location of said injection chamber so as to close the latter; a movable wall arranged at another location of said injection chamber and limiting the same with a counterforce; a path sensor arranged for sensing a position of said movable wall and supplying a signal for adjusting of said throttle; and means for adjusting said throttle in response to said signal; and further comprising a delivered quantity measuring device arranged downstream of said injection chamber and receiving a delivered quantity ($q_0$) averaged over the time and the outlets; means arranged upstream of said delivered quantity measuring device and operative for receiving individual amplitudes ($h_n$) of impulses associated with instantaneous injection outlet (n); and means for evaluating the signals ($h_{nm}$) in accordance with the formula $$Q_n = \frac{\sum\limits_m h_{nm}}{\sum\limits_m \sum\limits_{n=1}^{z} h_{nm}} \cdot q_0 \cdot \frac{1}{n_2}$$

where
 $n = 1 \ldots z$ is numbering of the z outlet of the injection pump;
 m is numbering of the m revolutions of the injection pump during the measurement;
 $n_2$ is the number of revolutions of the injection pump.

11. An arrangement for measuring the injection quantity, the injection beginning and the injection end of individual injections of an intermittently operating injection pump, comprising an injection chamber; a movable wall arranged so that the pump and said movable wall are connected in parallel to one another with said injection chamber; means for measuring the path of said movable wall; control means using the measured path and regulating the pump to number of revolutions $n_1$ proportional to the through-flow $q_0$; means at the pump for exactly receiving the delivered quantity $q_0$ averaged over the time and the outlets; means for receiving in said movable wall the amplitudes $h_n$ of impulses associated with the instantaneously injecting outlets n; and means for evaluation the signals in accordance with the formula $$Q_n = \frac{\sum\limits_m h_{nm}}{\sum\limits_m \sum\limits_{n=1}^{z} h_{nm}} \cdot q_0 \cdot \frac{1}{n_2}$$

wherein
 $n = 1 \ldots z$ is numbering of the z outlet of the injection pump;
 m is numbering of the m revolutions of the injection pump during the measurement;
 $n_2$ is the number of revolutions of the injection pump.

12. An arrangement as defined in claim 11, wherein said control means is an electric control loop; said movable wall being formed as a piston acting upon said electric control loop.

13. An arrangement as defined in claim 11, wherein said injection chamber is formed as a passage of through-flow measuring means.

* * * * *